(12) United States Patent
Cheng

(10) Patent No.: US 8,500,087 B2
(45) Date of Patent: Aug. 6, 2013

(54) MAGNETIC CONTROL VALVE

(76) Inventor: Chi-Han Cheng, Taichung (TW)

( * ) Notice: Subject to any disclaimer, the term of this patent is extended or adjusted under 35 U.S.C. 154(b) by 66 days.

(21) Appl. No.: 12/926,397

(22) Filed: Nov. 16, 2010

(65) Prior Publication Data

US 2012/0119122 A1    May 17, 2012

(51) Int. Cl.
   *F16K 31/02* (2006.01)
(52) U.S. Cl.
   USPC .................... 251/129.15; 251/30.05
(58) Field of Classification Search
   USPC ............. 251/129.15, 65, 30.01, 30.02, 30.03, 251/30.04, 30.05, 358
   See application file for complete search history.

(56) References Cited

U.S. PATENT DOCUMENTS

| | | | | | |
|---|---|---|---|---|---|
| 2,888,234 | A | * | 5/1959 | Dahl | 251/30.03 |
| 2,936,790 | A | * | 5/1960 | Erickson et al. | 138/46 |
| 2,939,927 | A | * | 6/1960 | Kozel et al. | 200/83 R |
| 3,391,900 | A | * | 7/1968 | Erickson | 251/120 |
| 3,476,146 | A | * | 11/1969 | Dolter | 137/601.13 |
| 4,502,661 | A | * | 3/1985 | Swanson | 251/30.04 |
| 4,860,990 | A | * | 8/1989 | Fukuzawa et al. | 251/30.03 |
| 4,981,155 | A | * | 1/1991 | Pick et al. | 137/238 |
| 5,145,145 | A | * | 9/1992 | Pick et al. | 251/30.03 |
| 5,449,142 | A | * | 9/1995 | Banick | 251/30.04 |
| 5,655,747 | A | * | 8/1997 | Pasut | 251/30.03 |
| 5,699,833 | A | * | 12/1997 | Tsataros | 137/624.11 |
| 7,320,456 | B2 | * | 1/2008 | Yajima | 251/65 |
| 7,481,412 | B2 | * | 1/2009 | Ishikawa et al. | 251/30.04 |
| 7,637,475 | B2 | * | 12/2009 | Adams | 251/129.01 |
| 2002/0195580 | A1 | * | 12/2002 | Chang | 251/65 |
| 2005/0178989 | A1 | * | 8/2005 | Stern | 251/30.03 |

* cited by examiner

*Primary Examiner* — John K Fristoe, Jr.
*Assistant Examiner* — Andrew J Rost
(74) *Attorney, Agent, or Firm* — Raymond Y. Chan; David and Raymond Patent Firm

(57) ABSTRACT

A magnetic control valve is to block an outlet end of a water inflow passage and an inlet end of a water outflow passage of a connection pipe by using a rubber ring. A valve of the rubber ring is opened or closed by a magnetic control switch. The magnetic control switch mainly takes a valve rod carrying permanent magnetic force that completely controls direction of electromagnetic pole as a power source for moving. When a valve plug at an end of the valve rod seals the valve, a metal plate capable of being sucked by magnetic force is combined with the rubber ring to allow both to generate magnetic sucking effect, thereby firmly closing.

9 Claims, 9 Drawing Sheets

MAGNETIC CONTROL VALVE

FIELD OF THE INVENTION

The present invention relates to a facility for controlling the turn-on state or the turn-off state of water flow, and more particularly to a technical innovation field of controlling the turn-on state or the turn-off state of water flow by applying a magnetic control valve.

BACKGROUND OF THE INVENTION

According to prior arts that are similar to a technique shown in the case, including U.S. published applications 20050184261, 20100019179, 20090224191, 20080216896, U.S. Pat. Nos. 7,296,593, 6,691,937, 6,688,577, 6,675,826, 6,619,612, 5,497,135, 6,073,904, 6,076,550, 7,637,475, 5,599,003, 5,503,362, 5,269,333, 5,145,145, 4,948,090, 4,934,651, 6,457,697, 5,738,138, 5,676,342, 7,703,740, 5,565,747, and 5,622,351, the technique features shown in the foregoing prior arts utilize a valve to partition pipes and water passages. The valve is controlled by a valve rod to show an opening or closing state. The valve rod is disposed to an end of a rod body. Another end of the rod body corresponding to the end of disposing the valve rod has a flexible element. The main functionality of the flexible element is to push the rod body to allow the valve rod to seal the valve. The rod body then is driven to displace to allow the valve rod of one end to eject from the valve. In the foregoing published applications and patents, most structures are driven by magnetic control devices.

However, the defects commonly existing in the foregoing prior arts are that when the valve is opened, the moved rod body moves toward a direction that is opposite to the pushing of the flexible element. A reverse damper generated by the flexible element that is compressed may cause shift phenomenon at the moving path for the rod body, resulting in non-smooth situation.

Moreover, the rod bodies utilized in the prior arts did not have magnetic function, and parts of disposing the valve are purely made of rubber. Consequently, when the valve rod disposed to an end of the rod body plugs up the valve, the pushing force generated by the flexible element is merely taken as a power source. None of any company can develop other innovate design in the present time. The conventional bottleneck needs to be break through.

Further, the foregoing published application and patents may also require many parts assembled to the whole structures to have drawbacks of higher manufacturing costs and labor costs at the installation operation.

In addition, the foregoing published application and patents must reserve higher lengths in an aspect of the structural design for controlling the valve. Consequently, the size of the magnetic control valve is extremely big and may not be reduced to achieve light weight and small sizes.

Accordingly, to overcome the foregoing shortcomings, the inventor(s) of the present invention based on years of experience in the related field to conduct extensive researches and experiments, and finally invented a magnetic control valve.

SUMMARY OF THE INVENTION

A primary objective of the present invention is to provide a magnetic control valve that has less parts than conventional structures and low manufacturing cost, smooth control motions of opening and closing valves, and light weight for volume without occupying spaces.

To achieve the foregoing objective, the magnetic control valve provided by the invention comprises a connection pipe having a water inflow passage and a water outflow passage. A circular seat is disposed to an engaging place between an outlet end of the water inflow passage and an inlet end of the water outflow passage, wherein a bottom of the circular seat forms an external baffle ring at the outlet end of the water inflow passage, and an inner concave slot disposed to an upper end surface of the external baffle ring. An inner baffle ring is formed at the inlet end of the water outflow passage, and the external baffle ring and the inner baffle ring are disposed at the same axle core;

A rubber ring is combined with a metal plate, wherein the metal plate in the embodiment is encapsulated inside the rubber ring, and the metal plate can be made of a metal material capable of being attracted by magnetic force, and the metal plate has a central hole. A plurality of through holes is distributed to a periphery of the central hole. A valve, which is encapsulated in the central hole of the metal plate, is formed at the rubber ring. The glue body of the rubber ring is filled within each through hole to cascade the glue bodies covering the metal plate so that the metal plate is firmly combined with the rubber ring. In addition, a flexible loop blade is connected to a periphery of the rubber ring, and an external ring is connected to a periphery of the flexible loop blade. The periphery at a bottom of the rubber ring can completely seal the inlet end of the water outflow passage, and a bottom of the external ring can seal the outlet end of the water inflow passage. A convex ring is downwardly extended from an external edge at the bottom of the external ring. The convex ring can closely fit the inner concave slot of the circular seat. More than one communicating water passages are disposed to a region of the flexible loop blade.

A magnetic control switch comprises a pipe seat, an upper cover, a magnetic sucking element and a valve rod. The pipe seat has a partition to divide the pipe seat into an independently upper pipe body space having upward opening and an independently lower pipe body space having downward opening. The pipe seat has a lower containing chamber jointed with a bottom of the lower pipe body space. An external frame is downwardly extended from the external periphery of the lower containing chamber. A bottom of the external frame can closely lean against an upper end surface of the external ring, and an external portion of the external frame can closely combine with the inside of the circular seat of the connection pipe. An exterior of the pipe seat is wound by an electromagnetic coil. The covering scope of the electromagnetic coil coves the lower pipe body space and the upper pipe body space, and the electromagnetic coil is connected to a magnetic pole switch. The electromagnetic coil can be controlled by the magnetic pole switch to generate a positive pole magnetic field or a negative pole magnetic field.

The upper cover can seal an upper opening end of the upper pipe body space. The magnetic sucking element is contained inside the upper pipe body space without any movement. The magnetic sucking element is made of a material capable of being attracted by a magnetic element.

The valve rod is fit inside the lower pipe body space and can be properly displaced and regulated. A bottom of the valve rod has a valve plug capable of completely sealing the valve of the rubber ring. The valve rod can be made of a magnetic material. In the embodiment, the valve rod comprises a magnetic element, a rubber sleeve pipe and a sealing cap for encapsulating the magnetic element. The valve plug of the valve rod is disposed at the external bottom of the sealing end of the rubber sleeve pipe. The opening of the valve plug is sealed by the external cover. Accordingly, the magnetic element may not be eroded by water.

With the composition of the foregoing components, when the electromagnetic coil is controlled by the switch to generate a magnetic field mutually repulsed with a magnetic pole at an end of the valve rod and a magnetic force of the magnetic field is larger than a magnetic force generated by the valve rod sucked to the magnetic element, the valve rod comes off the attraction of the magnetic element to instantly move toward a reverse direction to allow the bottom of the valve rod leaning against the upper end surface of the rubber ring so that the valve plug completely seals the valve of the rubber ring. The sealing effect between the valve plug and the valve can be increased through the mutual magnetic attraction produced between the metal plate inside the rubber ring and the valve rod. In the meantime, after water flow enters into the lower containing chamber through the communicating water passage of the flexible loop blade of the rubber ring from the outlet end of the water inflow passage, water stopping state is shown.

Reversely, when the electromagnetic coil controlled by the switch generates a magnetic file mutually attracted with a magnetic pole at an end of the valve rod and a magnetic force of the magnetic field is larger than the magnetic force of the valve rod attracted to the metal plate, the valve rod comes off the metal plate to instantly move toward a reverse direction to allow an end of the valve rod attracting the magnetic element so that the valve plug of the valve rod completely comes off the valve of the rubber ring to allow the valve shows an opening state. Accordingly, water flow originally staying in the lower containing chamber is introduced into the inlet end of the water outflow passage via the valve of the rubber ring, thereby smoothly draining water away.

DETAILED DESCRIPTION OF THE PREFERRED EMBODIMENTS

Figure 1:
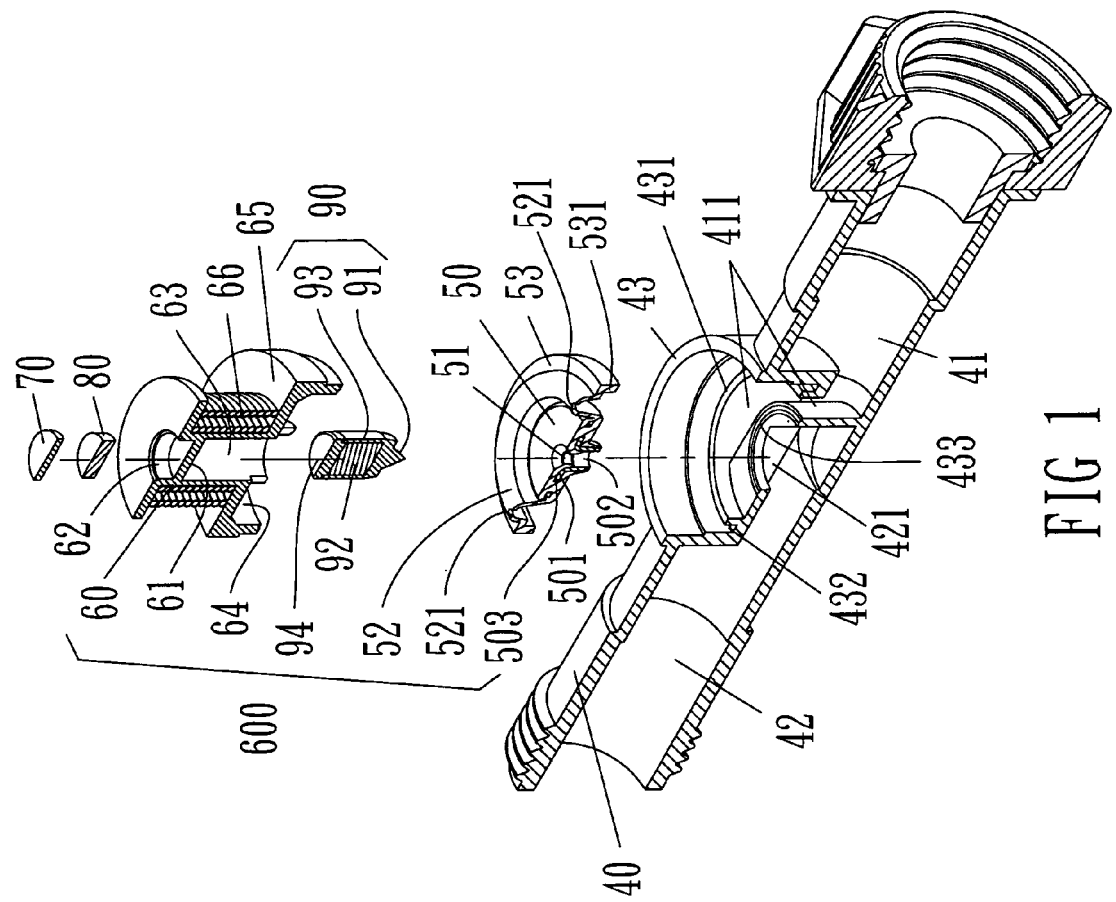
FIG. 1 is a decomposition drawing of a structure according to a preferred embodiment of the present invention.
Figure 2:
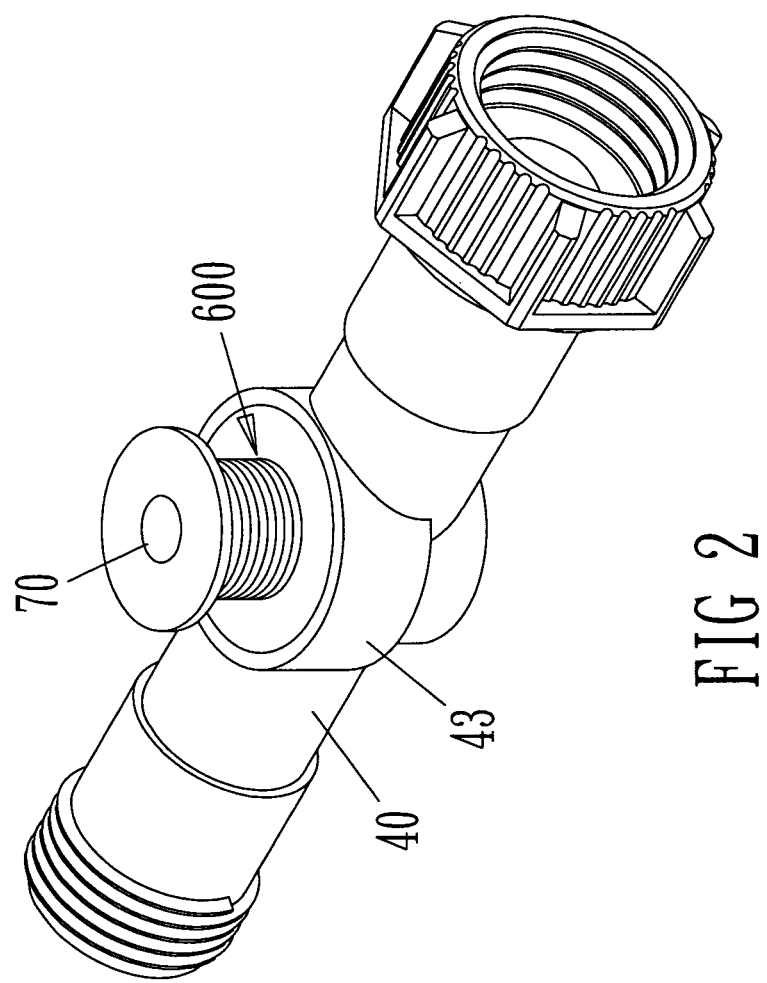
FIG. 2 is an assembly drawing of a structure according to a preferred embodiment of the present invention.

Other features and advantages of the present invention will become apparent from the following description of the invention which refers to the accompanying drawings.

Referring FIG. 1 to FIG. 7 for a magnetic control valve in accordance with a preferred embodiment of the present invention is depicted. The magnetic control valve comprises a connection pipe 40. The connection pipe 40 has a water inflow passage 41 and a water outflow passage 42, a circular seat 43 disposed to an engaging place between an outlet end 411 of the water inflow passage 41 and an inlet end 421 of the water outflow passage 42, wherein the circular seat has an outward opening. A bottom of the circular seat 43 has an external baffle ring 431 formed at the outlet end 411 of the water inflow passage 41, and an inner concave slot 432 is disposed to an upper end surface of the external baffle ring 431. An inner baffle ring 433 is formed with respect to the inlet end 421 of the water outflow passage 42, and the external baffle ring 431 and the inner baffle ring 433 are disposed to the same axle core.

Figure 3:
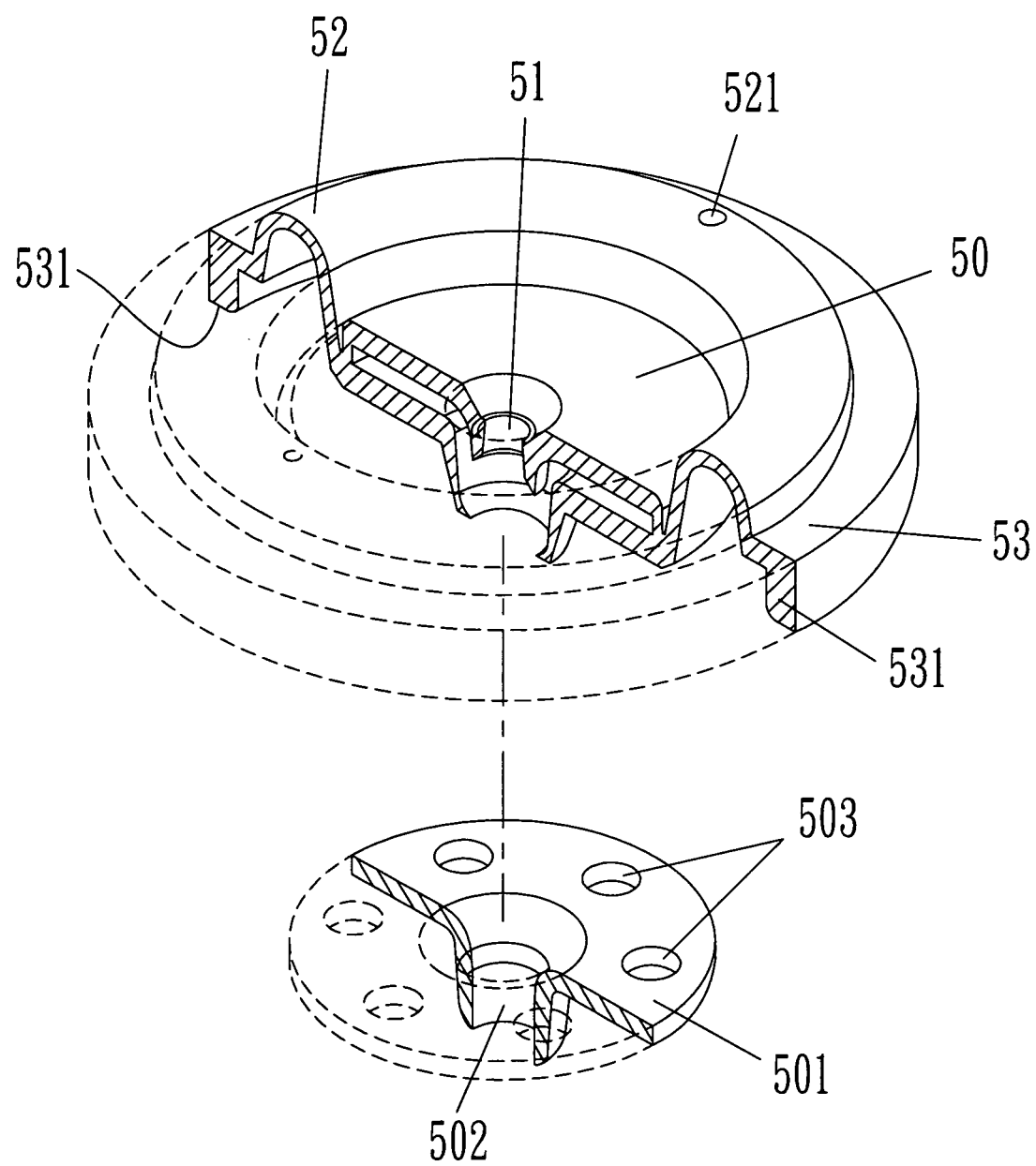
FIG. 3 is a decomposition drawing of a rubber ring in the structure according to a preferred embodiment of the present invention.

A rubber ring 50, as shown in FIG. 3, is combined with a metal plate 501, wherein the metal plate 501 is encapsulated inside the rubber ring 50, and the metal plate 501 is made of a metal material capable of being sucked by magnetic force. The metal plate 501 has a central hole 502, and a plurality of through holes 503 is distributed to a periphery of the central hole 502. The rubber ring 50 has a valve 51 encapsulated in the central hole 511 of the metal plate 501, and glue body of the rubber ring 50 fill with the inside of each through hole 503 of the metal plate 501 to cascade the bodies covering the metal plate 501 so that the metal plate 501 is firmly combined with the rubber ring 50. A flexible loop blade 52 is connected to an exterior of the rubber ring 50, and an external ring 53 is connected to a periphery of the flexible loop blade 52. A periphery of a bottom of the rubber ring 50 can completely seal the inlet end 421 of the water outflow passage 41, and a bottom of the external ring 53 can seal the outlet end 411 of the water inflow passage 41, and a convex ring 531 is downwardly extended from an external edge at the bottom of the external ring 53. The convex ring 531 can closely fit the inner concave slot 432 of the circular seat 43. In addition, more than one communicating water passages 521 are disposed to a region of the flexible loop blade 52.

A magnetic control switch 600 comprises a pipe seat 60, an upper cover 70, a magnetic sucking element 80 and a valve rod 90. The pipe seat 60 has a partition 61 to divide the pipe seat into an independently upper pipe body space 62 having upward opening and an independently lower pipe body space 63 having downward opening. The pipe seat 60 has a lower containing chamber 64 jointed with a bottom of the lower pipe body space 63. An external frame 65 is downwardly extended from the external periphery of the lower containing chamber 64. A bottom of the external frame 65 can closely lean against an upper end surface of the external ring 53 of the rubber ring 50, and an external portion of the external frame 65 can closely combine with the inside of the circular seat 43 of the connection pipe 40. In the embodiment, the manner for connecting the external frame 65 and the circular seat 43 adopts high frequency pressing or can be replaced with other conventionally equivalent techniques.

Moreover, the external portion of the pipe seat 60 is wound by an electromagnetic coil 66. The encapsulation scope of the electromagnetic coil 66 covers an upper section region of the lower pipe body space 63 and a whole region of the upper pipe body space 62, and the electromagnetic coil 66 is connected to a magnetic pole switch (not shown in the figure). The inner region of the electromagnetic coil 66 can be controlled by the magnetic pole switch to generate a positive pole magnetic field and a negative pole magnetic field.

The upper cover 70 can seal an upper opening end of the upper pipe body space 62. In the embodiment, the connection between the upper cover 70 and the opening end of the upper pipe body space 62 adopts high frequency pressing or can be completed by using gluing or other manners capable of closely connecting them.

The magnetic sucking element 80 is contained in the upper pipe body space 62 to form a non-moving state. The magnetic sucking element 80 is made of a material capable of being sucked by a magnetic element.

Figure 4:
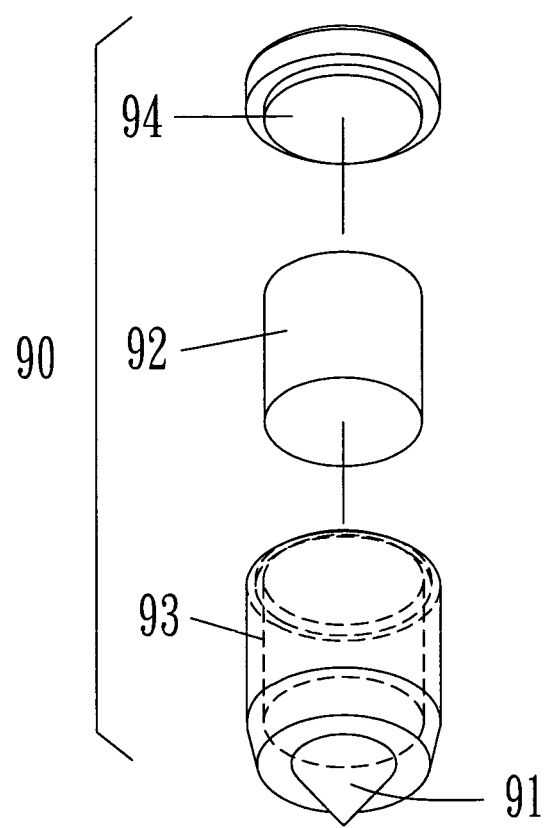
FIG. 4 is a decomposition drawing of a valve rod in the structure according to a preferred embodiment of the present invention.
Figure 5:
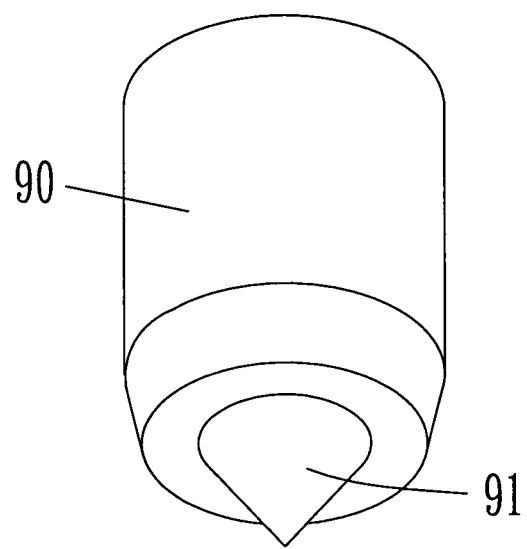
FIG. 5 is a three-dimensional drawing of a valve rod in the structure according to an another preferred embodiment of the present invention.

The valve rod 90 is fit inside the lower pipe body space 63 and can be properly moved and regulated. A end of the valve rod 90 has a valve plug 91 that can be regulated and moved to completely seal the valve 51 of the rubber ring 50. As shown in FIG. 5, the valve rod 90 in the embodiment can be made of a magnetic material capable of producing permanent magnetic force. Alternatively, as shown in FIG. 4, the valve rod 90, in another preferred embodiment, comprises a magnetic element 92 capable of producing permanent magnetic force and a rubber sleeve pipe 93 and a sealing cap 94 for encapsulating the magnetic element 92. In the detail depiction, the structure shown in FIG. 4 is taken as an embodiment. The valve plug 91 of the valve rod 90 is disposed at the external bottom of the sealing end of the rubber sleeve pipe 93. The opening end of the rubber sleeve pipe 93 is closed by the sealing cap 94. Accordingly, the magnetic element 92 may not be corroded by water.

Figure 6:
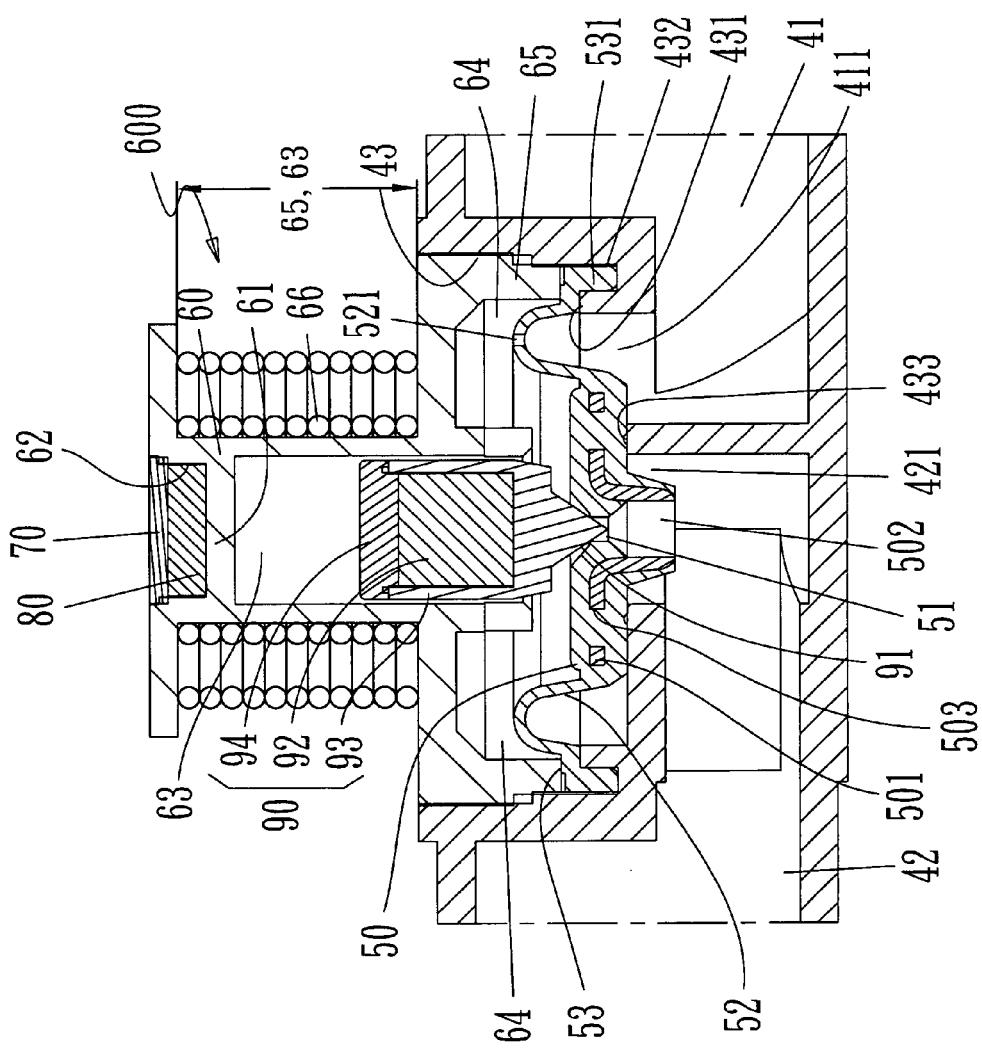
FIG. 6 is a movement drawing I of assembled cross-section form of the structure according to a preferred embodiment of the present invention.

With the composition of the foregoing components, as shown in FIG. 6, when the electromagnetic coil 66 controlled by the magnetic pole switch generates a magnetic field that is mutually repulsed with a magnetic pole of an end of the valve rod 90 and when the magnetic force of the magnetic field is larger than the magnetic force generated by the valve rod 90 sucked to the magnetic sucking element 80, the valve rod 90 comes off the sucking of the magnetic sucking element 80 to instantly move toward a reverse direction to allow the bottom of the valve rod 90 leaning against the upper end of the rubber ring 50 so that the valve plug 91 at the bottom of the valve rod 90 completely seals the valve 51 of the rubber ring 50. The sealing effect between the valve plug 91 and the valve 51 can be increased through the mutual magnetic attraction produced by the magnetic force between the metal plate 501 assembled to the rubber ring 50 and the valve rod 90, thereby assuring the sealing effect.

It should be noted that after water flow enters into the lower containing chamber 64 through a communicating water passage 521 of the flexible loop blade 52 of the rubber ring 50 from the outlet end 411 of the water inflow passage 41 of the connection pipe 40, the rubber ring 50 can be pushed by water pressure to allow the bottom of the rubber ring 50 to tightly seal the inlet end 421 of the water outflow passage 42.

Figure 7:
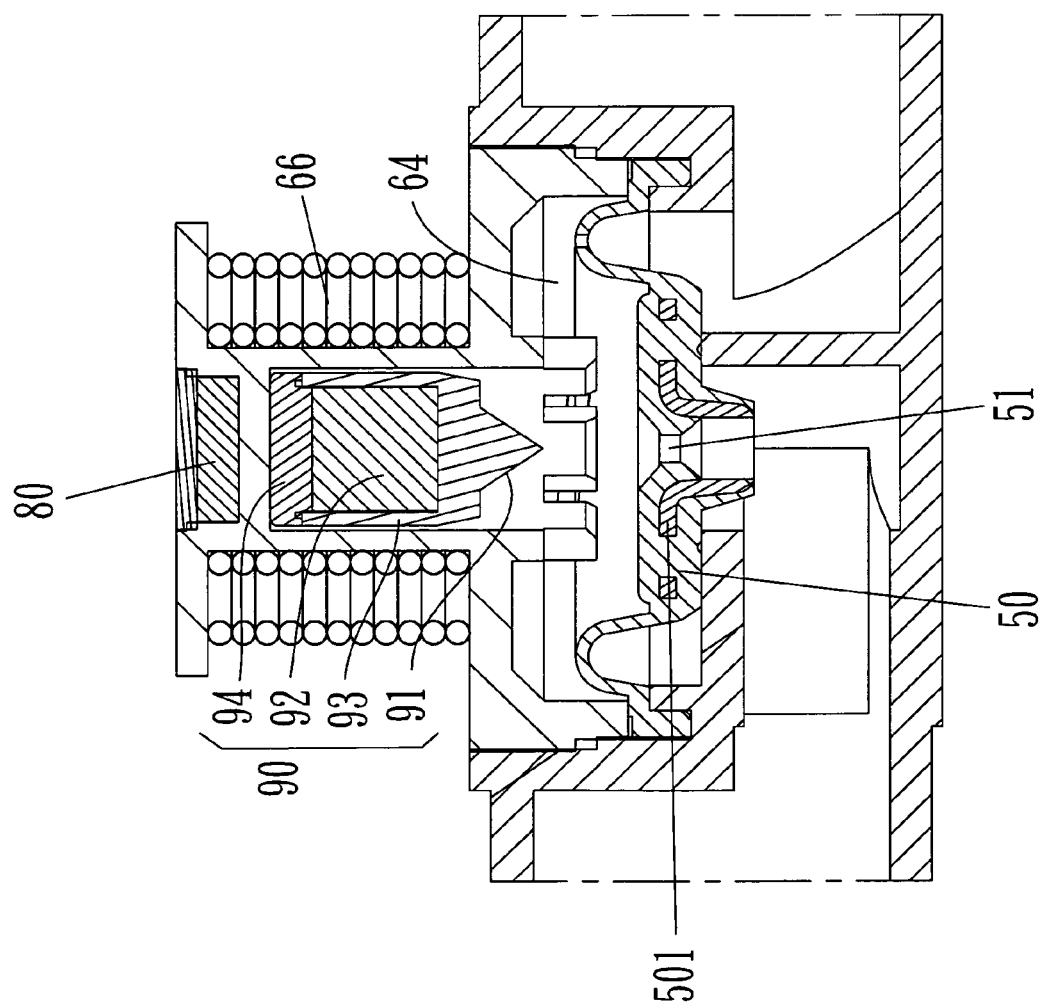
FIG. 7 is a movement drawing II of assembled cross-section form of the structure according to a preferred embodiment of the present invention.

As shown in FIG. 7, when the electromagnetic coil 66 can be controlled by the magnetic pole switch to generate a magnetic field mutually attracted with a magnetic pole at an end of the valve rod 90 and when the magnetic force of the magnetic field is larger than the magnetic force generated by the valve rod 90 sucked to the metal plate 501, the valve rod 90 comes off the mutual magnetic attraction generated with the metal plate 501 to instantly move toward a reverse direction so that an end of the valve rod 90 is sucked to the magnetic sucking element 80. The valve plug 91 of the valve rod 90 completely comes off the valve 51 of the rubber ring 50 to allow the valve 51 shows an opening state. Accordingly, water flow originally staying inside the lower containing chamber 64 is continuously introduced to the inlet end 421 of the water outflow passage 42 through the valve 51 of the rubber ring 50 so as to smoothly drain away.

Figure 8:
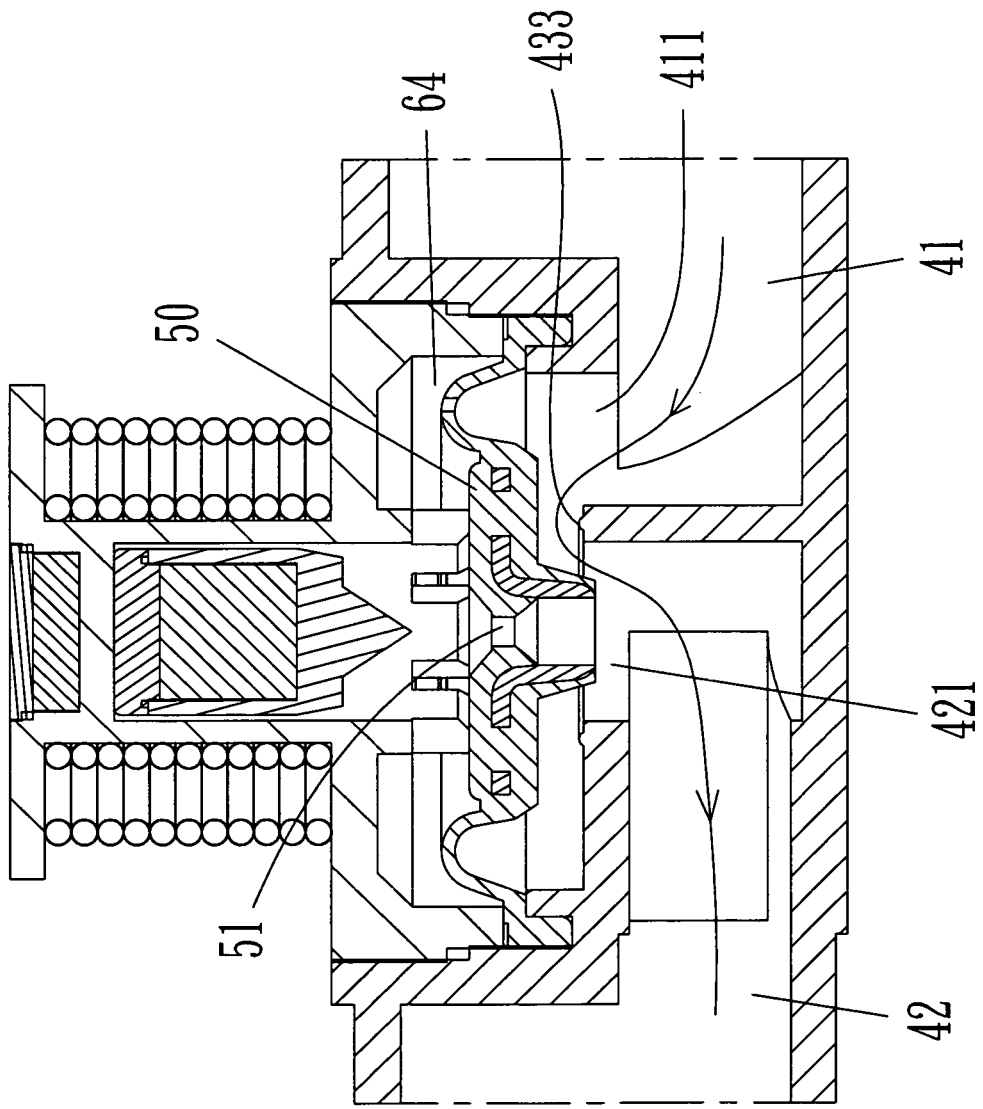
FIG. 8 is a movement drawing III of assembled cross-section form of the structure according to a preferred embodiment of the present invention.

As shown in FIG. 8, after the valve 51 of the rubber ring 50 shows the opening state, water flow introduced by the outlet end 411 of the water inflow passage 41, on the one hand, flows into the water outflow passage 42 via the valve 51 from the lower containing chamber 64, and on the other hand water flow may be influenced by the difference of dozen of times where a bore diameter of the communicating water passage 521 is smaller than a bore diameter of the outlet end 411. Water flow may push the rubber ring 50 due to stronger water flow force at the outlet end 411 to expose intervals at the bottom of the rubber ring 50 and the inner baffle ring 433 so that water flow is massively introduced to the inlet end 421 of the water outflow passage 42 via the foregoing intervals.

Figure 9:
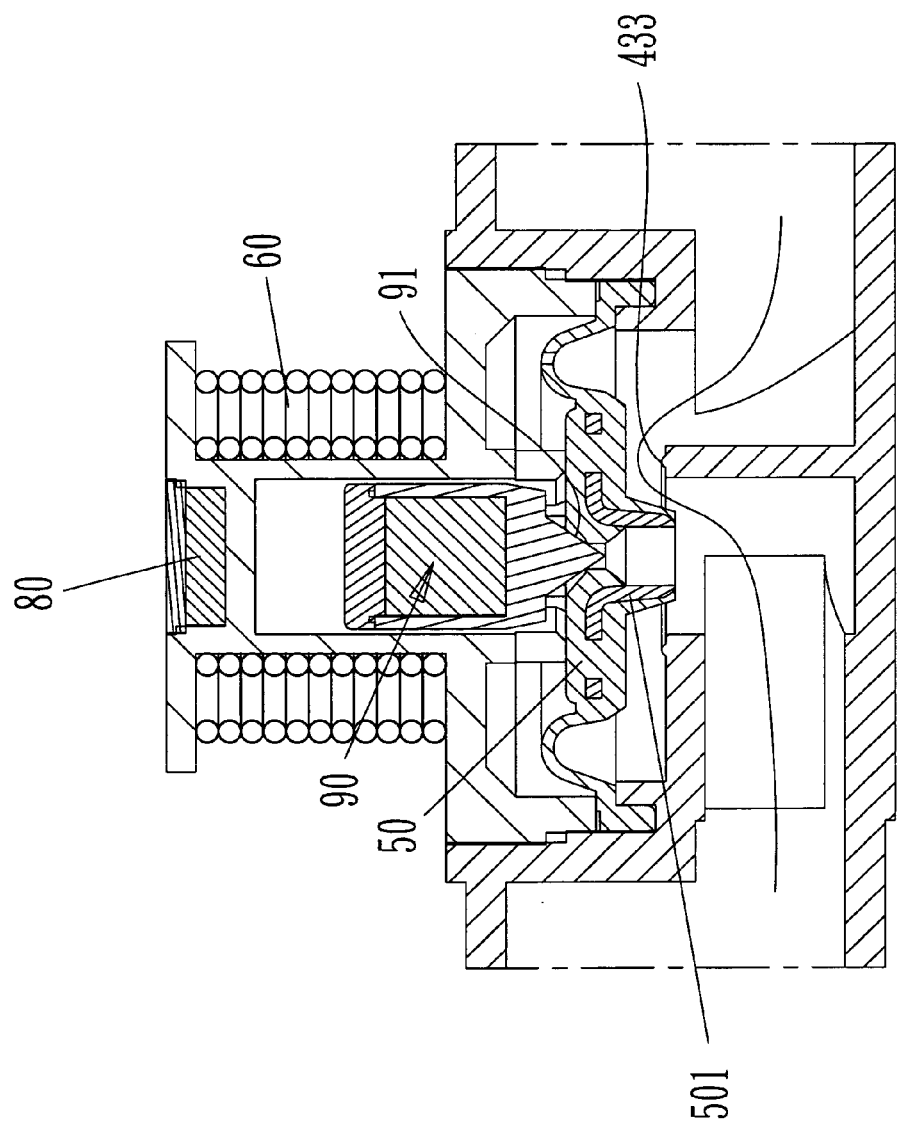
FIG. 9 is a movement drawing IV of assembled cross-section form of the structure according to a preferred embodiment of the present invention.

As shown in FIG. 9, when the electromagnetic coil 66 is controlled by the magnetic pole switch to generate a magnetic field mutually repulsed with a magnetic pole at an end of the valve rod 90 and when the magnetic force of the magnetic field is larger than the magnetic force generated by the valve rod 90 sucked to the magnetic sucking element 80, the valve rod 90 comes off the sucking of the magnetic sucking element 80 to instantly move toward a reverse direction. On the one hand, the bottom of the valve rod 90 leans against the upper end surface of the rubber ring 50, and the metal plate 501 can be closely attracted by the magnetic force generated from the valve rod 90 to allow the valve plug 91 to tightly seal the valve 51 of the rubber ring 50. On the other hand the rubber ring 50 synchronously and downwardly moves through the pushing effect of the valve rod 90 together with the valve rod 90 so that the bottom of the rubber ring 50 is mutually attached to the inner baffle ring 433 to form the sealing state, thereby returning to the state as shown in FIG. 6.

Although the features and advantages of the embodiments according to the preferred invention are disclosed, it is not limited to the embodiments described above, but encompasses any and all modifications and changes within the spirit and scope of the following claims.

What is claimed is:

1. A magnetic control valve, comprising:
   a connection pipe having a water inflow passage and a water outflow passage, and defining an engaging place between the water inflow passage and the water outflow passage;
   a circular seat having an outward opening provided at the engaging place;
   a valve means for controlling water flowing from the water inflow passage to the water outflow passage between an opened state and a closed state, wherein the valve means comprises a rubber ring fitted in a bottom of the circular seat and a metal plate encapsulated inside the rubber ring, wherein the metal plate is made of magnetic attracting material, wherein the metal plate has a central hole, wherein the rubber ring has a valve encapsulated in the central hole of the metal plate; and
   a magnetic control switch, which is assembled to the circular seat, comprising:
   a pipe seat wound by an electromagnetic coil, wherein the electromagnetic coil is connected to a magnetic pole switch, wherein the pipe seat is divided into an upper pipe body space and a lower pipe body space;
   a magnetic sucking element provided at the upper pipe body space of the pipe seat; and
   a valve rod movably provided at the lower pipe body space of the pipe seat, wherein the valve rod having a valve plug and comprises a magnetic element carrying permanent magnetic force that the valve plug is magnetically coupled at the central hole of the metal plate to tightly and magnetically seal at the valve of the rubber ring;
   wherein when the electromagnetic coil is activated by the magnetic pole switch to generate a magnetic field which is mutually attracted with an end of the valve rod and is larger than a magnetic force between the magnetic element and the metal plate, the valve rod is driven to magnetically detach from the metal plate and is magnetically attracted to the magnetic sucking element, such that the valve means is moved from the closed state to the opened state for allowing the water flowing from the water inflow passage to the water outflow passage;

wherein when the electromagnetic coil is activated by the magnetic pole switch to generate the magnetic field which is mutually repulsed with the end of the valve rod and is larger than a magnetic force between the magnetic element and the magnetic sucking element, the valve rod is driven to detach from the magnetic sucking element and is magnetically attracted back to the metal plate so as to allow the valve plug tightly and magnetically seal at the valve of the rubber ring, wherein the rubber ring is synchronously pushed by the valve rod and sealed at the circular seat to move the rubber ring back to the closed state from the opened state for blocking the water flowing from the water inflow passage to the water outflow passage.

2. The magnetic control valve, as recited in claim 1, wherein the metal plate further has a plurality of through holes distributed to a periphery of the central hole, wherein the rubber ring has a glue body filled inside of each through hole of the metal plate to firmly combine the metal plate with the rubber ring.

3. The magnetic control valve, as recited in claim 2, wherein the valve rod further comprises a rubber sleeve pipe receiving the magnetic element therein, and a sealing cap coupled at an opening end of the rubber sleeve pipe to encapsulate the magnetic element in the rubber sleeve pipe.

4. The magnetic control valve, as recited in claim 3, wherein the circular seat further comprises an external baffle ring and has an inner concave slot disposed to an upper end surface of the external baffle ring, wherein the valve means further comprises a flexible loop blade connected to a periphery of the rubber ring, an external ring connected to a periphery of the flexible loop blade, and a convex ring downwardly extended from an external edge at a bottom of the external ring, wherein the convex ring is closely fitted to the inner concave slot of the circular seat.

5. The magnetic control valve, as recited in claim 2, wherein the valve rod is the magnetic element.

6. The magnetic control valve, as recited in claim 5, wherein the circular seat further comprises an external baffle ring and has an inner concave slot disposed to an upper end surface of the external baffle ring, wherein the valve means further comprises a flexible loop blade connected to a periphery of the rubber ring, an external ring connected to a periphery of the flexible loop blade, and a convex ring downwardly extended from an external edge at a bottom of the external ring, wherein the convex ring is closely fitted to the inner concave slot of the circular seat.

7. The magnetic control valve, as recited in claim 1, wherein the valve rod further comprises a rubber sleeve pipe receiving the magnetic element therein, and a sealing cap coupled at an opening end of the rubber sleeve pipe to encapsulate the magnetic element in the rubber sleeve pipe.

8. The magnetic control valve, as recited in claim 1, wherein the valve rod is the magnetic element.

9. The magnetic control valve, as recited in claim 1, wherein the circular seat further comprises an external baffle ring and has an inner concave slot disposed to an upper end surface of the external baffle ring, wherein the valve means further comprises a flexible loop blade connected to a periphery of the rubber ring, an external ring connected to a periphery of the flexible loop blade, and a convex ring downwardly extended from an external edge at a bottom of the external ring, wherein the convex ring is closely fitted to the inner concave slot of the circular seat.

\* \* \* \* \*